United States Patent [19]
Fukagawa

[11] Patent Number: 5,415,291
[45] Date of Patent: May 16, 1995

[54] CASING FOR MULTIPLE DISC CARTRIDGES
[75] Inventor: Hiroshi Fukagawa, Kanagawa, Japan
[73] Assignee: Sony Corporation, Tokyo, Japan
[21] Appl. No.: 108,322
[22] Filed: Aug. 18, 1993
[30] Foreign Application Priority Data
  Sep. 4, 1992 [JP] Japan .................. 4-260525
[51] Int. Cl.⁶ ............................................. B65D 85/30
[52] U.S. Cl. .................. 206/308.3; 206/309; 206/312
[58] Field of Search ............... 206/309, 310, 311, 312, 206/387, 444, 449, 455, 472, 473

[56] References Cited
U.S. PATENT DOCUMENTS

| | | | |
|---|---|---|---|
| 3,848,738 | 11/1974 | Hirsch | 206/472 |
| 4,535,888 | 8/1985 | Nusselder | 206/444 |
| 4,807,079 | 2/1989 | Takahashi | 360/133 |
| 4,823,950 | 4/1989 | Roze | 206/311 |
| 4,829,510 | 5/1989 | Takahashi | 369/290 |
| 4,848,585 | 7/1989 | Snyder | 206/472 |
| 4,874,085 | 10/1989 | Grobecker et al. | 206/309 |
| 4,886,166 | 12/1989 | Bankier et al. | 206/472 |
| 4,899,875 | 2/1990 | Herr et al. | 206/309 |
| 5,016,752 | 5/1991 | Haugen, Jr. | 206/455 |
| 5,269,409 | 12/1993 | Brandt et al. | 206/311 |
| 5,277,313 | 1/1994 | Morita | 206/387 |

FOREIGN PATENT DOCUMENTS

| | | |
|---|---|---|
| 0186359A3 | 7/1986 | European Pat. Off. . |
| 4200471A1 | 8/1992 | Germany . |
| WO88/06559 | 9/1988 | WIPO . |
| WO92/11787 | 7/1992 | WIPO . |

Primary Examiner—David T. Fidei
Attorney, Agent, or Firm—W. Patrick Bengtsson; Limbach & Limbach

[57] ABSTRACT

A casing for containing a plurality of disc cartridges each having an optical disc contained in it includes a first casing main member, a second casing main member and a partitioning member. The first casing main member is provided with a first holding section for resiliently holding one of the disc cartridges. The second casing main member is provided with a second holding section for resiliently holding another disc cartridge. The partitioning member includes a pair of plate-shaped sections and a connecting section interconnecting the plate-shaped sections in parallel with each other. The first and the second casing main members are rotatably arranged between the plate-shaped sections so that the holding sections are directed inwardly and so that the first and second casing main members face each other with the connection section in-between.

5 Claims, 9 Drawing Sheets

CASING FOR MULTIPLE DISC CARTRIDGES

BACKGROUND

1. Field of the Invention

This invention relates to a casing for housing a disc cartridge for containing a disc-shaped recording medium therein. More particularly, it relates to a disc cartridge casing for housing a plurality of disc cartridges.

2. Background of the Invention

There has hitherto been presented a variety of disk-shaped recording media, referred to hereinafter as discs, enabling recording of information signals. During transportation or non-using period, the discs are stored in a sturdy casing. A compact disc, for example, having a larger thickness, is directly contained in a casing made up of a casing main member and a lid rotatably mounted on the casing main member, because there is no necessity to take protective measures against dust and dirt deposition (see for example U.S. Pat. Nos. 4,874,085 and 4,535,888).

The casing for the compact disc includes a holding protrusion at a mid portion of the major surface of the casing main member which is slightly larger than a center opening in the compact disc and which may be resiliently flexed towards the center by providing plural radially extending grooves, and a recess of a diameter substantially equal to the outer diameter of the compact disc surrounding the holding protrusion. The lid is in the shape of a saucer of a shallow depth and is provided with a plurality of holding lugs facing its peripheral wall. A printed matter, such as a song word card, is inserted between the holding lug and the inner surface of the lid.

Thus the compact disc is contained and held within the casing by having the holding protrusion engaged in the center aperture of the disc and by having the disc rim kept in pressure contact with the inner peripheral wall of the recess.

Figure 1:
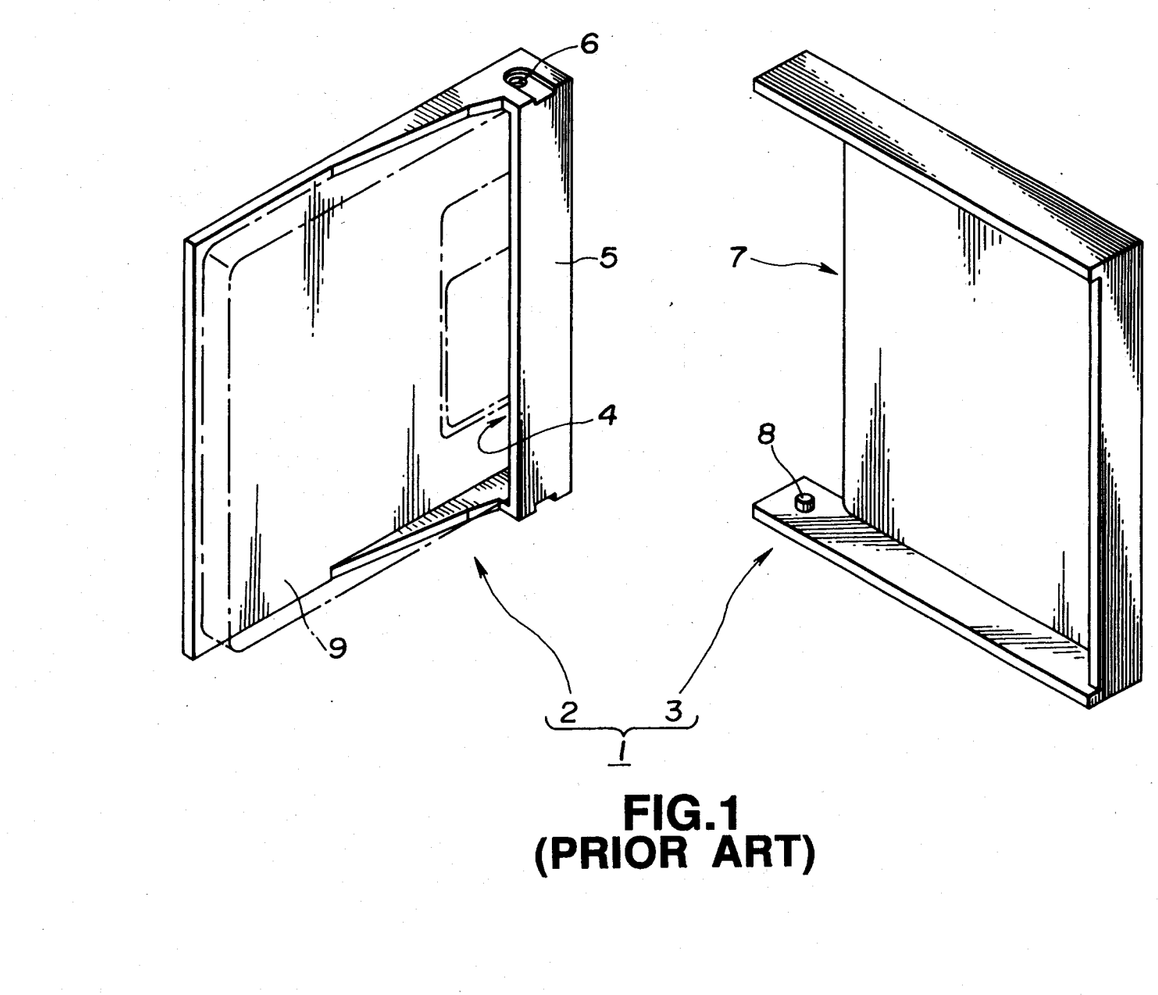
FIG. 1 is an exploded perspective view showing a conventional casing for a disc cartridge according to the prior art.

A small-sized magnetic disk, employed in an information or office equipment, has a magnetic material coated on its film-like sheet, so that it is contained in a disk cartridge for protecting its information signal recording surface. Such magnetic disk cartridge is contained in a casing made up of a casing main body 2 and a lid 3, as shown in FIG. 1.

The casing main body 2, formed of plastics, is plate-shaped on the whole, and has a channel-shaped holding section 5 forming a pocket 4 towards an edge of one of its major surfaces, and a pair of through-holes 6 on both lateral sides of the holding section 5 which are aligned axially with each other.

The lid 3, molded from transparent plastics, is formed as a square saucer of shallow depth, having one of the lateral sides removed, and is formed with dowels 8 on the inner surfaces of both lateral sidewall sections towards the open side. The dowels 8 are formed in register with the through-holes 6 in the casing main body 2 and are axially aligned with each other.

In assembling the casing 1, the lid 3 is connected to the casing main body 2, as the lateral sides of the lid 3 are extended apart so that the dowels are engaged in the through-holes 6. As a result thereof, the lid 3 is pivotally mounted on the casing main body 2. The magnetic disk cartridge 9 may be housed within the casing 1 by having its lateral side introduced into the pocket 4.

As for the magneto-optical disc, a laser light beam is radiated on the signal recording layer for heating it, and an external magnetic field is applied to the recording layer for recording desired information signals in a direction of magnetization corresponding to the direction of the external magnetic field. Since the laser beam is employed for recording and reproducing information signals in the magneto-optical disc, the information signals may be recorded and/or reproduced with an extremely high density. For example, music signals continuing for approximately 70 minutes may be recorded on the magneto-optical disc having a diameter of 12 cm.

The magneto-optical disc, which permits high density recording and/or reproduction of information signals, is deteriorated in recording/reproducing characteristics, even if only a small amount of dust and dirt is deposited on its signal recording surface. Consequently, the magneto-optical disc is contained in a disc cartridge, similarly to the above-mentioned magnetic disk (see for example U.S. Pat. No. 4,807,079).

In order for the magneto-optical disc to be positively integrated to a disc table of a disc drive apparatus with high precision positioning with respect to the center of rotation of the disc table, a magnetic metal plate is mounted at the center opening of the disc (see for example U.S. Pat. No. 4,829,510). Consequently, the optical disc cartridge having a magneto-optical disc contained therein cannot be contained in a casing adapted for holding the disc by taking advantage of the center aperture of the disc, as in the case of the above-mentioned compact disc, in view of the reduced thickness and flexibility of the magneto-optical disc. For this reason, a casing made up of a casing main body having a container pocket and a pivotally mounted lid, similarly to that used for a floppy disk, is generally employed.

Although it is possible with an optical disc having the diameter of 12 cm to record information signals continuing for approximately 70 minutes, a classic music, continuing for an extended period of time, cannot be recorded in one optical disc, so that it is recorded in plural discs. Besides, there may be occasions wherein an album is to be edited by plural optical discs.

If a work is to be recorded on a plurality of optical disc cartridges, these optical disc cartridges are naturally contained in one and the same casing.

If plural optical disc cartridges are to be contained in the above-described conventional casing, it may be contemplated to increase the pocket size in proportion to the number of the optical disc cartridges to be contained in the casing.

However, with the above-described casing for the optical disc cartridges, it is naturally difficult to form plural partitions within the pocket. Thus the optical disc cartridges are inserted loosely in the pocket. The result is that it becomes necessary to take out the optical disc cartridges out of the casing as the correct sequence of the optical disc cartridges contained in the casing is confirmed each time the disc cartridge is to be used, thus rendering the cartridge takeout operation labor-consuming.

It is also difficult to set aside a space for the printed matters, such as exposition of the numbers or the song word cards, within the casing. Besides, it is difficult to accommodate the exposition or the song word card in the casing so as to be associated with the correct optical disc cartridge.

In other words, if, when a work is to be constituted by plural optical disc cartridges, the conventional casing is to be remodelled for accommodating plural optical disc cartridges, the casing thus remodelled is simply a casing for accommodating several optical disc cartridges or several song word cards. Consequently, the casing is not in orderly state as a commercial product, while it cannot be put to practical use conveniently.

On the other hand, if the music recorded in the optical disc cartridge is to be played outdoors, it is necessary to transport several optical disc cartridges. Since the conventional practice is to have an optical disc cartridge contained in one casing, several casings need to be transported, which means a cumbersome operation.

SUMMARY OF THE INVENTION

It is an object of the present invention to provide a casing for containing a plurality of disc cartridges.

According to the present invention, there is provided a casing for containing a plurality of disc cartridges each having an optical disc contained therein. The casing includes a first casing main member, a second casing main member and a partitioning member. The first casing main member is provided with a first holding section for resiliently holding one of the disc cartridges. The second casing main member is provided with a second holding section for resiliently holding another disc cartridge. The partitioning member includes a pair of plate-shaped sections and a connecting section interconnecting the plate-shaped sections in parallel with each other. The first and the second casing main members are rotatably arranged between the plate-shaped sections so that the holding sections are directed inwardly and so that the first and second casing main members face each other with the connection section in-between.

It is possible with the casing for the disc cartridge of the present invention to have plural disc cartridges contained in good order. Besides, the printed matter, such as a song word card, may also be contained in the container.

DESCRIPTION OF THE INVENTION

Referring to the drawings, preferred illustrative embodiments of the present invention will be explained in detail.

By way of a first embodiment of the present invention, FIGS. 2 to 7 illustrate a casing 10 for containing two disc cartridges, that is a first optical disc cartridge 40A and a second optical disc cartridge 40B. The casing 10 is made up of first and second casing main members 20A, 20B and a partitioning member 30 rotatably mounted on the front and back sides of the casing main members 20A, 20B. The casing main members 20A, 20B are symmetrical as to the front and back sides so as to be usable by left-handers as by right-handers and are fabricated from a transparent synthetic material in the form of rectangular saucers of a shallow depth.

In the following description, the casing main members and the optical disc cartridges 40A, 40B are referred to by generic terms of a casing main body 20 and an optical disc cartridge 40, respectively, unless otherwise specified.

Figure 2:
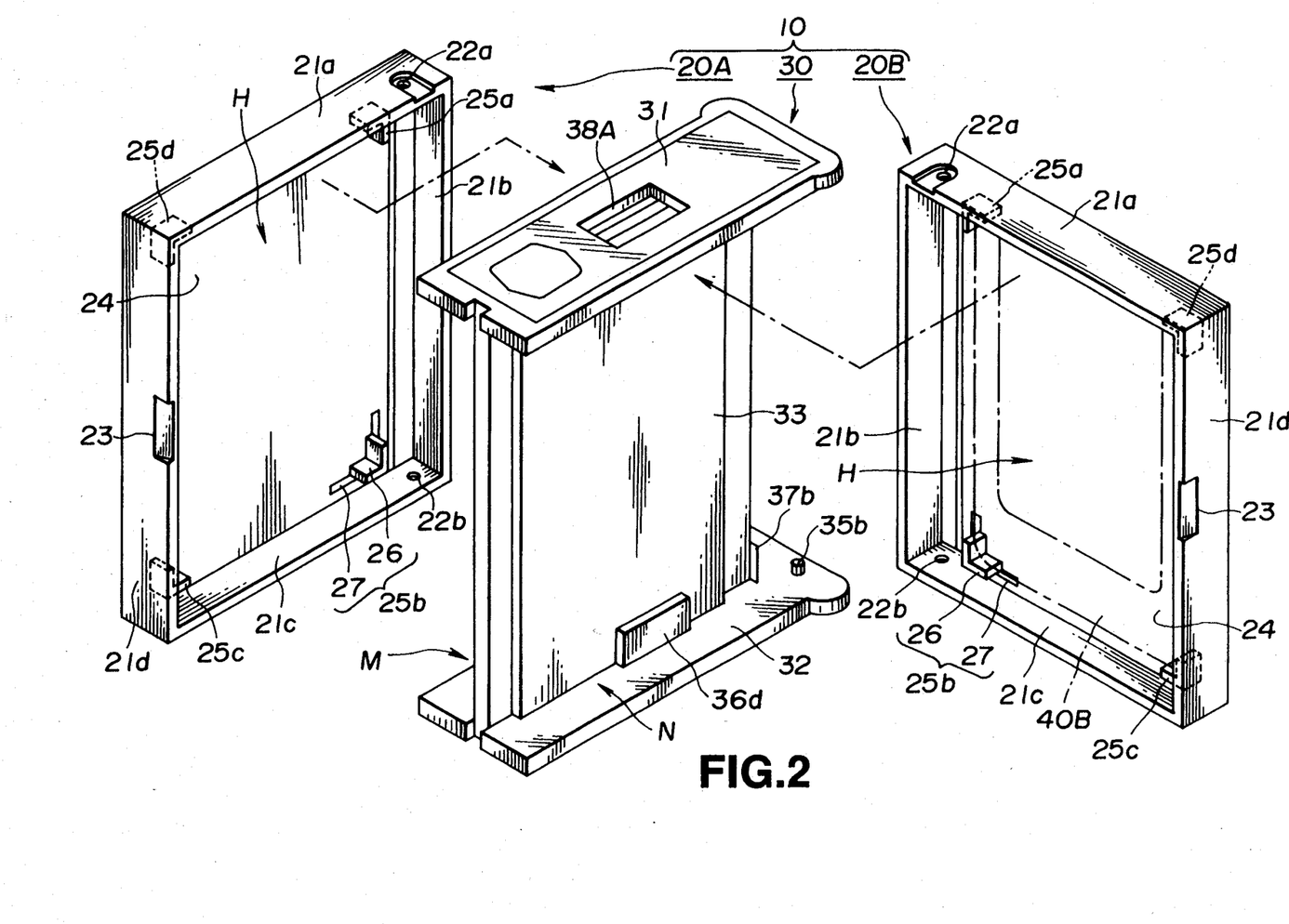
FIG. 2 is an exploded perspective view showing a casing for two disc cartridges according to a first embodiment of the casing for an optical disc cartridge according to the present invention.

The casing main body 20 has four peripheral sidewall members 21a to 21d having a height and a size large enough to accommodate the optical disc cartridge 40 therein.

Referring to FIG. 2, a set of peripheral sidewall members 21a, 21c of the casing main body 20, shown as horizontally extending sidewall members, are formed with vertically aligned through-holes 22a, 22b towards a vertically extending sidewall member 21b and outwardly of resilient holding members 25 as hereinafter explained. A finger setting recess or finger rest 23 is formed in the vertically extending sidewall member 21d opposite to the sidewall member 21b.

Resilient holding members 25a to 25d, referred to by a generic term of the resilient holding member 25, for holding the optical disc cartridge 40, are integrally formed at the four corners of a major surface 24 of the casing main body 20 delimited by the four sidewall members 21a to 21d. These resilient holding members 25 are provided at the four corners of the major surface 24 of the casing main body 20 in register with the four corners of the optical disc cartridge 40 held thereby.

Referring to FIG. 2, each resilient holding member 25 is made up of a substantially L-shaped holding wall member 26 extending parallel to the associated sidewall members and a substantially L-shaped aperture 27 formed in the major surface 24 for extending along the wall members 26. By virtue of the aperture 27, the holding wall member 26 may be resiliently flexed in a direction at right angles to the major surface 24.

A rectangular area H, delimited by the holding wall members 26 of the resilient holding section 25, represents a containing area for containing the optical disc cartridge 40. The rectangular area H is dimensioned to be slightly larger than the outer size of the optical disc cartridge 40. When the optical disc cartridge 40 is thrust onto the rectangular area H, the holding wall members 26 are flexed slightly outward for elastically holding the four corners of the optical disc cartridge 40.

With the above-described first embodiment of the casing main body 20, the L-shaped resilient holding section 25 is provided at the four corners of the casing main body 20 for elastically holding the four corners of the optical disc cartridge 40. Alternatively, plate-shaped holding wall members, not shown, may also be provided for extending parallel to the sidewall members 21a to 21d for elastically holding the four lateral sides of the optical disc cartridge 40.

Figure 5:
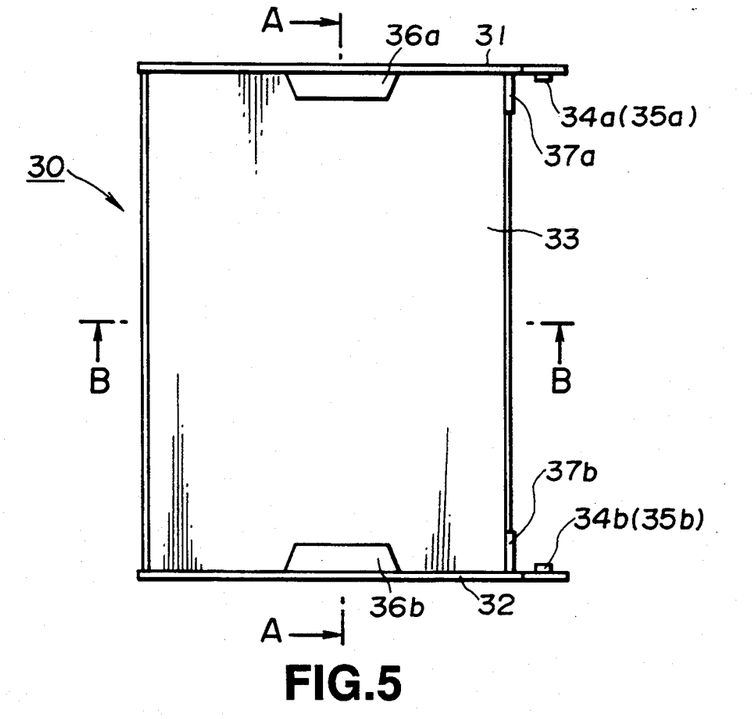
FIG. 5 is aside elevational view sowing a partitioning member of the casing shown in FIG. 2.
Figure 6:
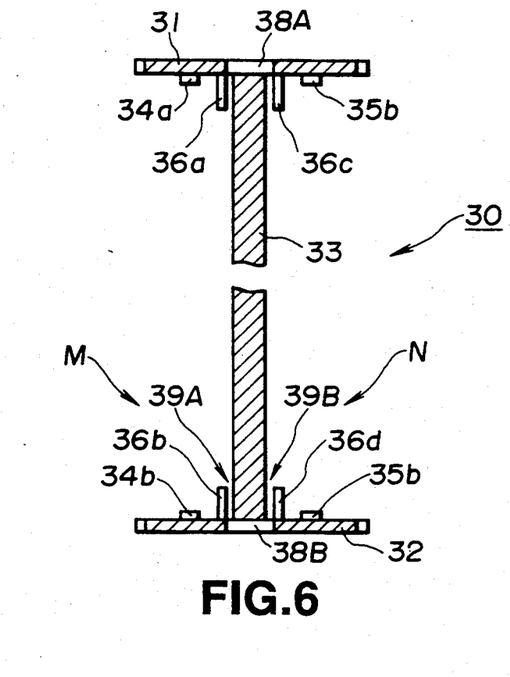
FIG. 6 is a longitudinal cross-sectional view of the partitioning member taken along line A—A of FIG. 5.
Figure 7:
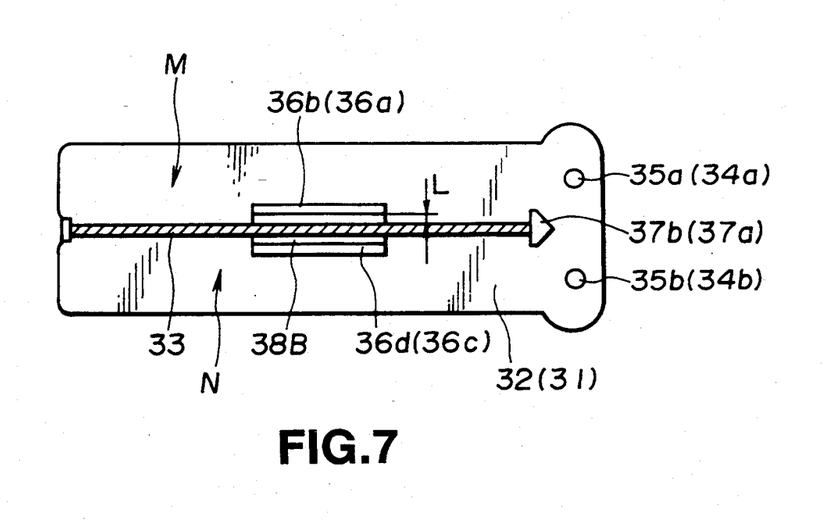
FIG. 7 is a longitudinal cross-sectional view of the partitioning member taken along line B—B of FIG. 5.

The partitioning member 30, as a base member, formed of synthetic resin, is made up of an upper plate 31, a lower plate 32 facing the upper plate and a partitioning plate 33 interconnecting the upper and lower plates at a mid position along the widths thereof. The casing main body 20, also acting as a housing cover for the base member 30, is rotatably mounted on the front and back sides of the base member 30. The partitioning plate 33 interconnects the upper plate 31 and the lower plate 32 parallel to each other in the overall shape of a vertically elongated letter H. The upper plate 31 and the lower plate 32, defining a first widthwise area M and a second widthwise area N along with the partitioning plate 33, are dimensioned in the widthwise direction so as to be slightly larger than twice the thickness of the casing main body 20. In other words, the combined widthwise dimension of the first area M and the second area N of the upper and the lower plates 31, 32 is approximately equal to the thickness of the casing main body 20. Besides, the longitudinal dimension of each of the upper and lower plates 31, 32 is selected to be slightly larger than the widthwise dimension of the casing main body 20, that is the longitudinal dimension of each of the sidewall members 21a, 21c of the casing main body 20.

The inner surfaces of the upper plate 31 and the lower plate 32, facing each other, are formed with dowels 34a, 35a, 34b, 35b, which are aligned axially with each other and which are located at widthwise mid position in the vicinity of lateral sides of the first area M and the second area N, respectively. These dowels are occasionally referred to herein by generic term dowels 34, 35. The inner surfaces of the upper and lower plates 31, 32 are formed with upstanding wall members 36a to 36d, which are located within the areas M and N and at a spacing L from the partitioning plate 33.

A first holding section 39A for holding a song word card is constituted in the first area M by the upstanding wall members 36a, 36b formed on the inner surfaces of the upper plate 31 and the lower plate 32 and by the associated major surface of the partitioning plate 33. A second holding section 39B for holding another song word card is constituted in the second area N by the upstanding wall members 36c, 36d formed on the inner surfaces of the upper plate 31 and the lower plate 32 and by the associated major surface of the partitioning plate 33.

Figure 4:
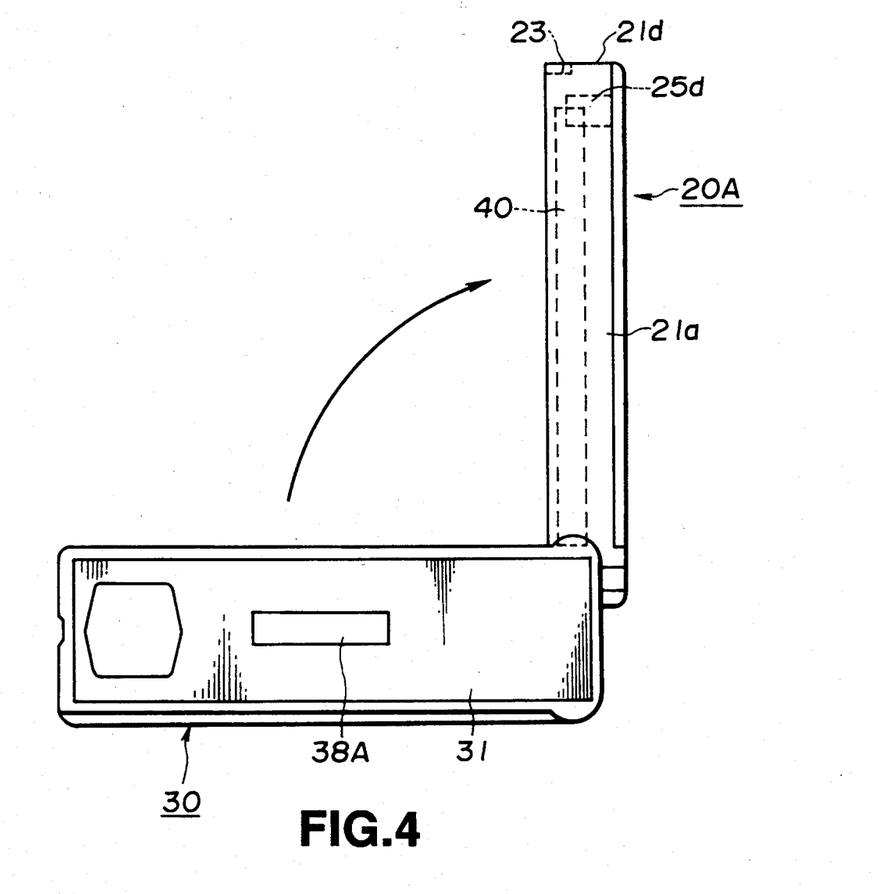
FIG. 4 is a side elevational view sowing the casing of FIG. 2 with one of the main members of the casing opened.

The first song word card 41A and the second song word card 41B as the printed matter are inserted into the holding sections 39A, 39B along the front and back sides of the partitioning plate 33, as shown in FIG. 4.

The inner surfaces of the upper and lower plates 31, 32, formed with the dowels 34, 35, are also formed with stop wall members 37a, 37b which are made as one with the associated lateral sides of the partitioning plate 33. These stop wall members 37a, 37b are triangular in horizontal cross-section so that both lateral sides thereof are extended from the associated lateral sides of the partitioning plate 33 to the first and second areas M, N, respectively. Thus the stop wall members 37a, 37b are engaged with the first and second song word cards 41A, 41B inserted into the holding sections 39A, 39B so as to be retained by the partitioning plate 33.

Pattern draw openings 38A, 38B are formed at mid portions of the upper and lower plates 38A, 38B for forming the upstanding wall members 36a to 36d.

With the above construction of the casing main member 20 and the partitioning member 30, the casing main member 20 is thrust from the lateral sides of the partitioning member 30 so that he dowels are in register with the through-holes 22. The upper plate 31 and the lower plate 32 of the partitioning member 30 are slightly flexed in the vertical direction due to their resiliency. Then, with the dowels 34a, 35a engaged in the through-holes 22a, 22b, respectively, the first casing member 20A is mounted in the first area M of the partitioning member 30. Similarly, with the dowels 34b, 35b engaged in the through-holes 22a, 22b, respectively, the second casing member 20B is mounted in the second area N of the partitioning member 30. Meanwhile, the casing main member 20 and the partitioning member 30 are formed with snap-engaging means for holding the casing main member 20 and the partitioning member 30 in the assembled position.

Figure 3:
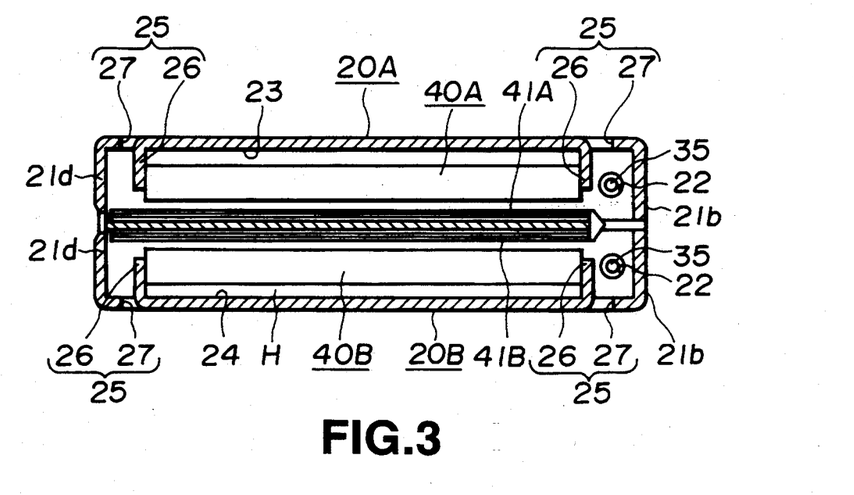
FIG. 3 is a longitudinal cross-sectional view of the casing shown in FIG. 2.

With the casing main member 20 and the partitioning member 30 thus assembled together to form the casing 10, the first optical disc cartridge 40A is housed and held within the first area M of the partitioning member 30. Similarly, the second optical disc cartridge 40B is housed and held within the second area N of the partitioning member 30.

In association with the first optical disc 20A, the first song word card 41A is housed within the first holding section 39A formed in the first area M of the partitioning member 30. On the other hand, in association with the second optical disc 20B, the second song word card 41B is housed within the second holding section 39B formed in the second area N of the partitioning member 30.

In this manner, the optical disc cartridges 40A, 40B and song word cards 41A, 41B are housed in ordered array in the casing 10, with the partitioning plate 33 of the partitioning member 30 in-between, as shown in FIG. 4.

Thus, if the first disc cartridge 40A is to be in use, it may be taken out by opening the casing main member 20A at the finger rest 23, as shown in FIG. 4.

In FIGS. 8 to 13, a casing 50 according to a second embodiment of the present invention is shown. In FIGS. 8 to 13, the components which are the same as those used in the previous embodiment are indicated by the same numerals and the corresponding description is omitted for simplicity. In the present second embodiment, the casing 50 is able to contain four optical disc cartridges 40A to 40D therein. The first and second casing main members 20A, 20B for housing the first and second optical disc cartridges 20A, 20B therein are constructed in the same manner as the casing 10 explained in connection with the first embodiment. It is a partitioning member 60, adapted for housing third and fourth optical disc cartridges 40A, 40B therein, which is characteristic of the present second embodiment.

Figure 8:
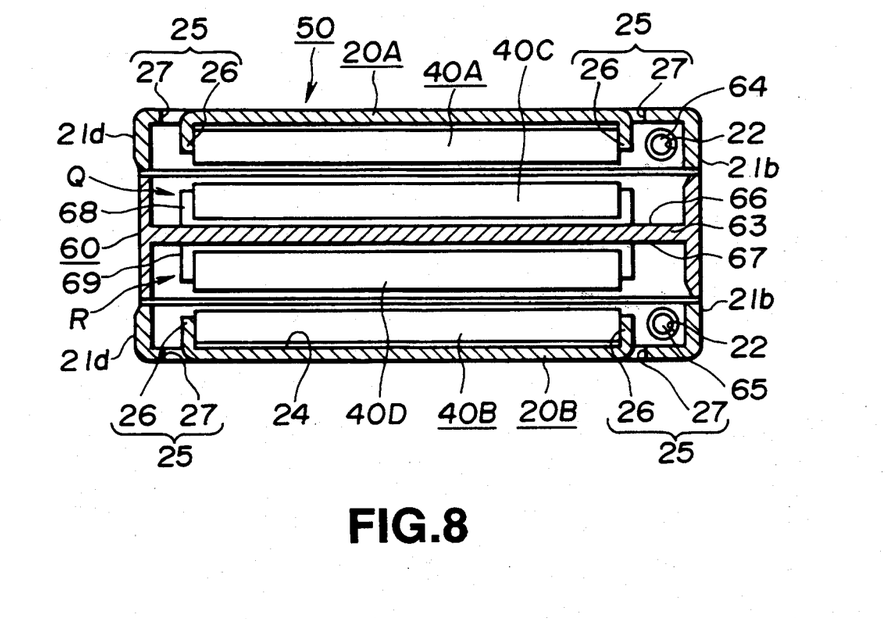
FIG. 8 is a longitudinal cross-sectional view showing a casing for four disc cartridges according to a second embodiment of the casing for an optical disc cartridge according to the present invention.
Figure 10:
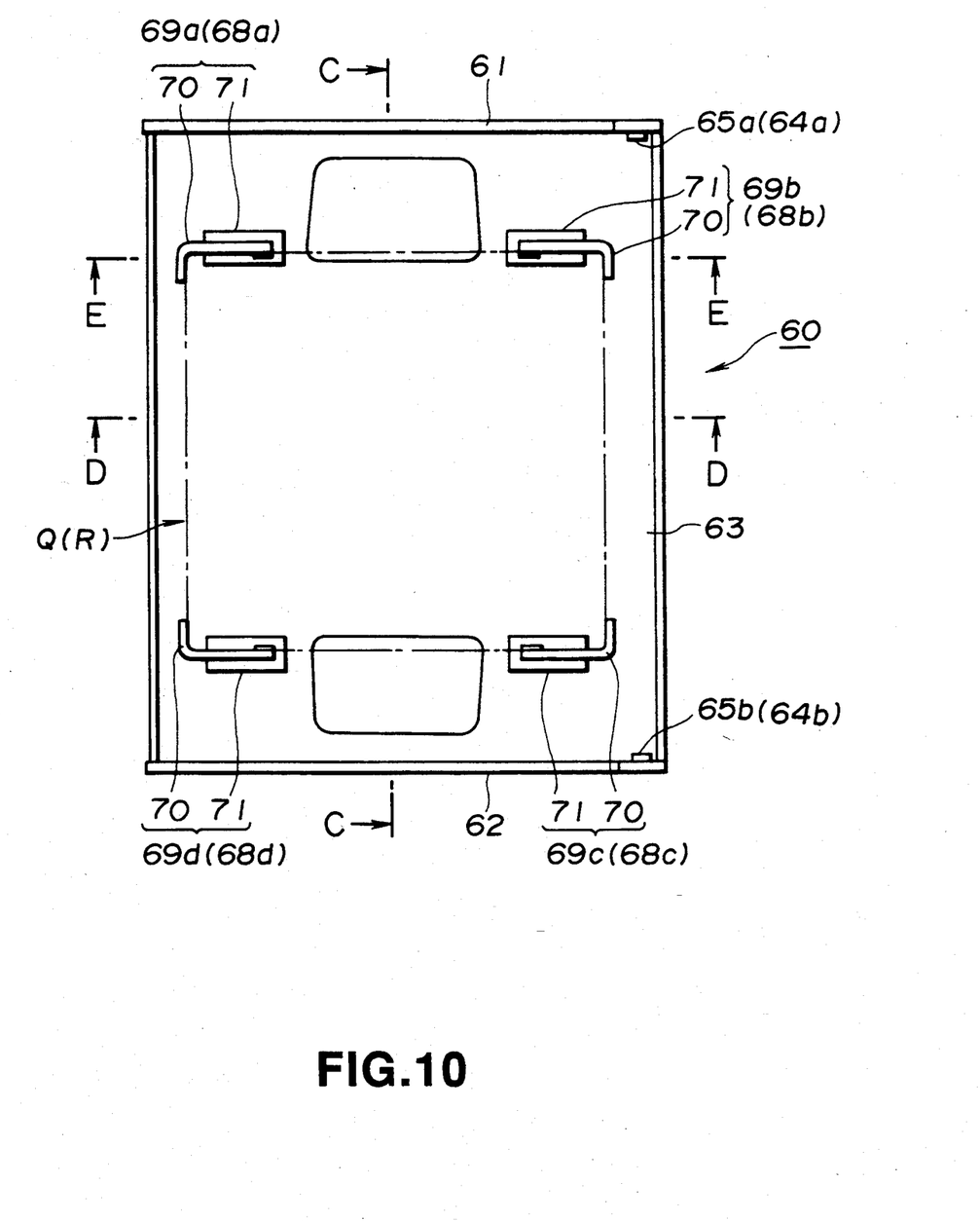
FIG. 10 is aside elevational view sowing a partitioning member of the casing shown in FIG. 8.
Figure 11:
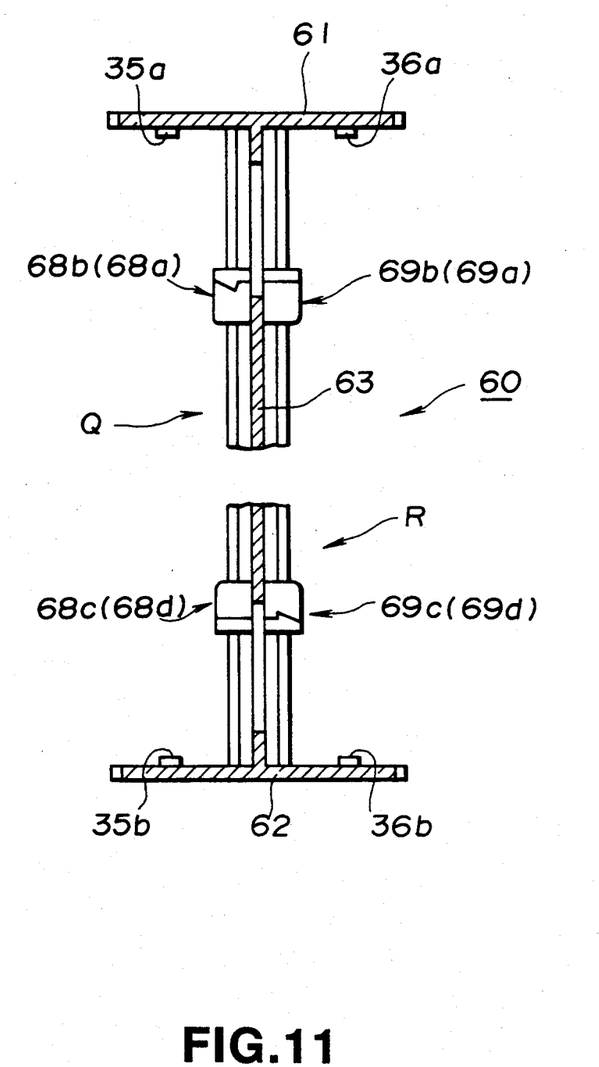
FIG. 11 is a longitudinal cross-sectional view of the partitioning member taken along line C—C of FIG. 10.
Figure 12:
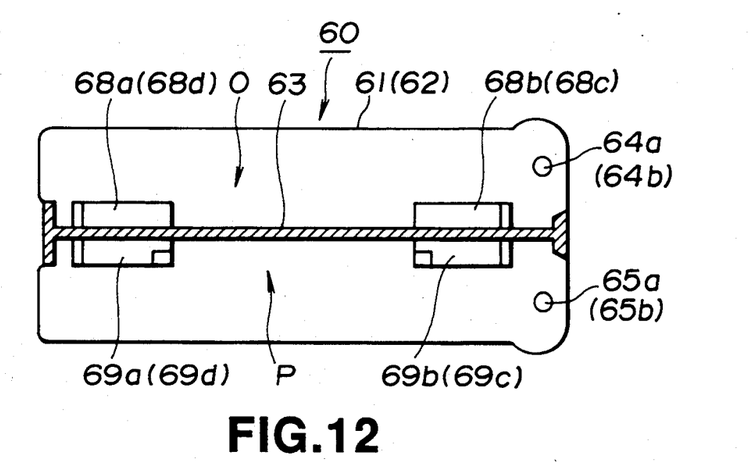
FIG. 12 is a longitudinal cross-sectional view of the partitioning member taken along line D—D of FIG. 10.
Figure 13:
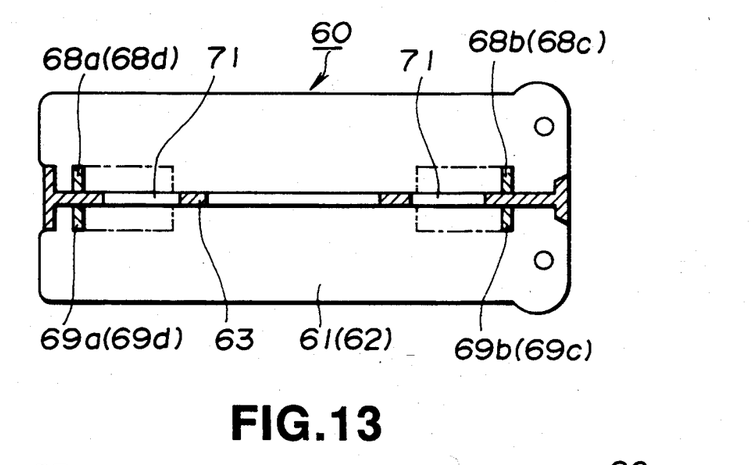
FIG. 13 is a longitudinal cross-sectional view of the partitioning member taken along line E—E of FIG. 10.

The partitioning member 60, formed of synthetic resin, is made up of an upper plate 61 and a lower plate 62 facing each other and a partitioning plate 63 interconnecting the upper and lower plates 61, 62 at widthwise mid positions thereof. The partitioning member 60, made up of the upper plate 61, lower plate 62 and the partitioning plate 63 interconnecting the upper and the lower plates in parallel with one another, is in the shape of an elongated letter H. The upper plate 61 and the lower plate 62, partitioned in the widthwise direction by the partitioning plate 63 into a first area O and a second area P, are of a width slightly larger than the thickness of the casing main body 20. In other words, the widthwise dimension of the first and second areas O and P of the upper plate 61 and the second plate 62 is selected to be approximately twice the thickness of the casing main body 20. Besides, the longitudinal dimension of the upper plate 61 and the lower plate 62 is selected to be slightly larger than the longitudinal dimension of the peripheral wall members 21a, 21c of the casing main body 20 which are shown as horizontally extending wall members in FIG. 2.

The inner surfaces of the upper and lower plates 66, 67, facing each other, are formed with axially aligned upper and lower dowels 64a, 65a, 64b, 65b, at mid portions and in the vicinity of the lateral sides of the first area O and the second area P. These dowels are occasionally referred to herein by generic terms of dowels 64, 65.

Resilient holding sections 68a to 68d and resilient holding sections 69a to 69d, occasionally referred to herein as resilient holding sections 68, 69, are formed on front and back surfaces 66, 67 of the partitioning member 63 for housing and holding the third and fourth optical disc cartridges 40C, 40D, respectively. These resilient holding sections 68, 69 are provided at four points on the front and back surfaces 66, 67 of the partitioning plate 63 in register with the four corners of the optical disc cartridges 40C, 40D, housed and held therein.

The resilient holding section 68 is made up of a plurality of holding wall members 70 and openings 71, as shown in FIG. 10. The holding wall members 70 are each extended from the major surface 66 of the partitioning member 63 in the direction of the upper plate 61 and the lower plate 62 and are bent at their distal ends at right angles in the direction of the opposite side holding wall members 70. Each opening 71 is bored around the proximal ends of the associated holding wall member 70. By virtue of the opening 71, the associated holding wall member 70 may be resiliently flexed in a direction parallel to the major surface 66. The resilient holding sections 69, provided on the major surface 67, are constructed in a similar manner.

The holding wall members 70 of the resilient holding sections 68a to 68d and 69a to 69d delimit rectangular areas Q and R on the major surfaces 66 and 67 of the partitioning plate member 63 for housing the optical disc cartridges 40C, 40D therein. The rectangular areas Q, R are dimensioned to be slightly larger than the outer size of the optical disc cartridge 40.

The third and fourth optical disc cartridges 40C, 40D are elastically maintained at the four corners thereof by being thrust onto the rectangular areas Q, R, with he free ends of the holding wall members 70 being then elastically flexed slightly outward. With the dowels 64, 65 being engaged in the through-holes 22a, 22b, the first and second casing main members 20A, 20B are mounted for rotation in the rectangular areas Q and R delimited on the front and back surfaces 66, 67 of the partitioning pate 63 of the partitioning member 60.

With the casing 50 thus formed by assembling the casing main body 20 and the partitioning member 60, the first optical disc cartridge 40A is contained in the above-described manner within the first casing main member 20A housed within the first rectangular area Q of the partitioning member 60. Similarly, the second optical disc cartridge 40B is housed within the second casing member 20B housed within the second rectangular area R. Besides, the third optical disc cartridge 40C is housed within the first rectangular area Q delimited on the major surface 66 of the partitioning member 66. Similarly, the fourth optical disc cartridge 40D is housed within the second rectangular area R delimited on the opposite major surface 67 of the partitioning member 66.

Figure 9:
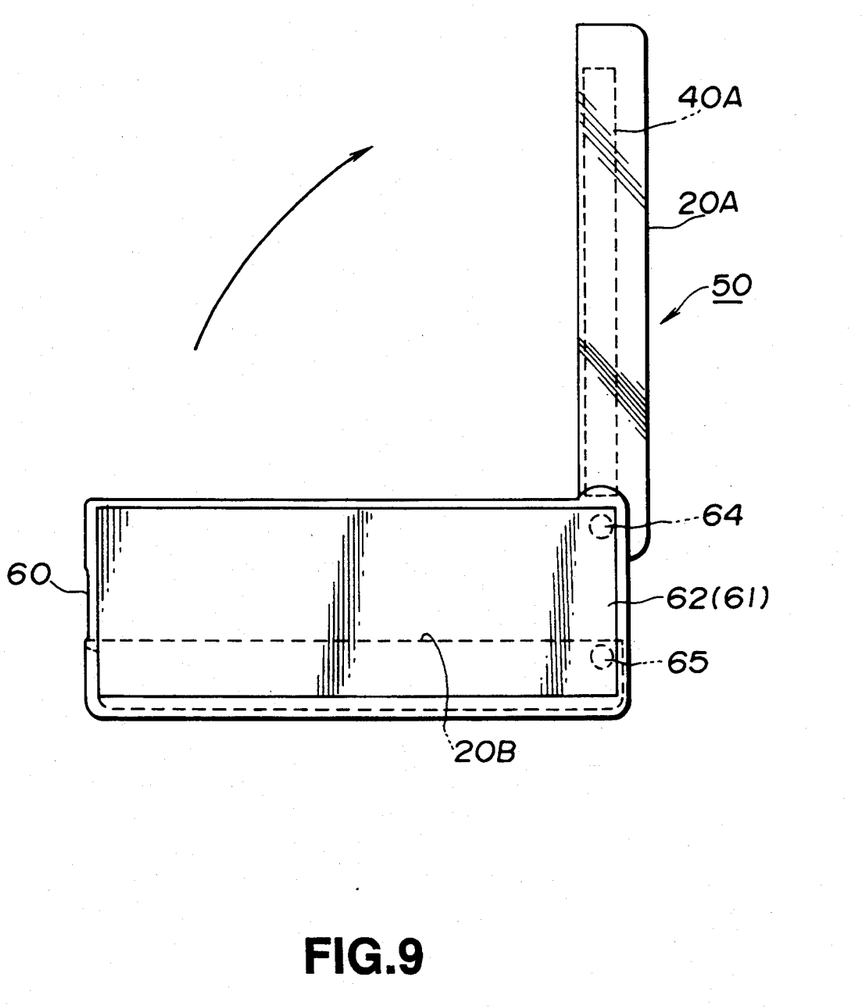
FIG. 9 is a side elevational view sowing the casing of FIG. 8 with one of the main members of the casing opened.

If the first disc cartridge 40A or the third disc cartridge 40C is to be in use, the first optical disc cartridge 40A may be taken out by opening the casing main member 20A via finger rest 23.

Meanwhile, with the above-described first embodiment, song word cards 41A, 41B are housed on the front and back surfaces of the partitioning plate member 33, whereas, in the second embodiment, the optical disc cartridges 40C, 40D are housed in the front and back surfaces of the partitioning member 60. However, the present invention is not limited to these embodiments.

For example, a casing for containing three optical disc cartridges may be constituted by housing the optical disc cartridge on one major surface of the partitioning plate of the partitioning member by an arrangement of the second embodiment, while song word cards may be contained on the other major surface by an arrangement described in the first embodiment.

Figure 14:
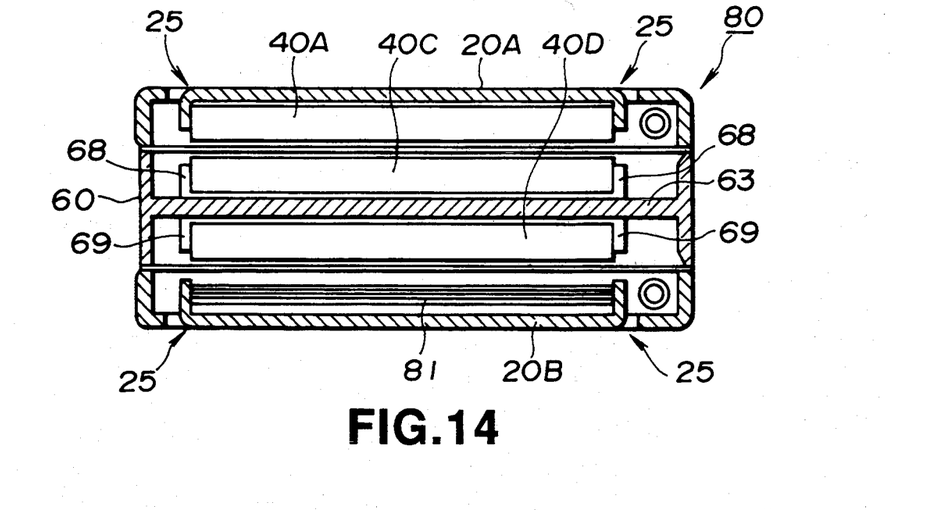
FIG. 14 is a longitudinal cross-sectional view showing a casing for three disc cartridges according to a third embodiment of the casing for an optical disc cartridge according to the present invention.

A casing 80 for three optical disc cartridges may be constructed by a third embodiment shown in FIG. 14. In this case, a resilient holding section 25 formed in the casing main member 20B is utilized for containing a song word card 81 therein. The present third embodiment is otherwise similar in construction and operation to the above-described first and second embodiments and hence the corresponding description is omitted for simplicity.

What is claimed is:

1. A casing for multiple disc cartridges comprising:
a first casing member having a first resilient holding section for resiliently holding a disc cartridge comprising a plurality of holding wall members;
a second casing member having a second resilient holding section for resiliently holding a disc cartridge comprising a plurality of holding wall members; and
a partitioning member having a pair of plate-shaped sections each having a width larger than the sum of the thicknesses of said first and second casing members and a partitioning plate interconnecting said plate-shaped sections at mid portions thereof so that said plate-shaped sections extend parallel to each other, said partitioning member being in the shape of a letter H, said first and second casing members being rotatably arranged between said plate-shaped sections with the connecting portion in-between, said partitioning member comprising a printed matter holding section for holding printed matter on a surface of said partitioning plate, said printed matter holding section comprising a plurality of upstanding wall members protruding inwardly from said plate-shaped members.

2. A casing for multiple disc cartridges comprising:
a first casing member comprising a first resilient holding section for resiliently holding a disc cartridge;
a second casing member comprising a second resilient holding section for resiliently holding another disc cartridge; and
a partitioning member having a pair of plate-shaped members and a partitioning plate for interconnecting said plate-shaped members in parallel with each other, said first and second casing members being rotatably arranged between said plate-shaped members for facing each other with said partitioning plate in-between so that the holding sections of said first and second casing members are directed inwardly, said partitioning member being provided with a printed matter holding means for holding printed matter on a surface of said partitioning plate, said printed matter holding means comprising a plurality of upstanding wall members protruding inwardly from said plate-shaped members.

3. A casing for multiple disc cartridges comprising:
a first casing member having a first resilient holding section for resiliently holding a disc cartridge comprising a plurality of holding wall members;
a second casing member having a second resilient holding section for resiliently holding a disc cartridge comprising a plurality of holding wall members; and
a partitioning member having a pair of plate-shaped sections each having a width larger than the sum of the thicknesses of said first and second casing members and a partitioning plate interconnecting said plate-shaped sections at mid portions thereof so that said plate-shaped sections extend parallel to each other, said partitioning member being in the shape of a letter H, said first and second casing members being rotatably arranged between said plate-shaped sections with the connecting portion in-between, wherein said partitioning member comprises a printed matter holding section for holding printed matter on a surface of said partitioning plate.

4. A casing for multiple disc cartridges comprising:
a first casing member having a first resilient holding section for resiliently holding a disc cartridge comprising a plurality of holding wall members;
a second casing member having a second resilient holding section for resiliently holding a disc cartridge comprising a plurality of holding wall members; and
a partitioning member having a pair of plate-shaped sections each having a width larger than the sum of the thicknesses of said first and second casing members and a partitioning plate interconnecting said plate-shaped sections at mid portions thereof so that said plate-shaped sections extend parallel to each other, said partitioning member being in the shape of a letter H, said first and second casing members being rotatably arranged between said plate-shaped sections with the connecting portion in-between, wherein said partitioning member further comprises a plurality of upstanding wall members protruding inwardly from said plate-shaped members for holding printed matter.

5. A casing for multiple disc cartridges according to claim 4, wherein said plurality of upstanding resilient holding sections are positioned on said casing members to define a rectangular area within which said disc cartridge is resiliently held.

* * * * *